3,031,508
PREPARATION OF ALDEHYDES BY CATALYTIC OXIDATION
Robert W. Etherington, Jr., Pennington, and Calvin N. Wolf, Trenton, N.J., assignors to Petro-Tex Chemical Corporation, Houston, Tex., a corporation of Delaware
No Drawing. Filed Mar. 13, 1959, Ser. No. 799,103
4 Claims. (Cl. 260—604)

This invention relates to an improved process for the manufacture of aldehydes by catalytic air oxidation of olefins and relates more particularly to an improved process for producing unsaturated aliphatic aldehydes such as methacrolein by reacting a mixture of isobutylene and air in the presence of a novel catalyst.

Production of aliphatic aldehydes by vapor phase catalytic oxidation of hydrocarbons is known. The principal method currently employed for making acrolein and methacrolein is by the catalytic oxidation of propylene and isobutylene in the presence of catalysts such as copper oxides. High yields are not obtained with these catalysts, requiring recycling large streams of reactants.

It is an object of this invention to provide an improved process for obtaining high yields of aldehydes by vapor phase oxidation of olefins. It is another object of this invention to provide an improved process for the vapor phase oxidation of mono-olefins, particularly isobutylene to methacrolein, in high yields. It is a further object of this invention to provide a novel catalyst useful in obtaining increased yield of product by vapor phase catalytic oxidation of olefins to unsaturated aliphatic aldehydes, and methods for making such catalysts. Other objects and advantages of the invention will be apparent from the description thereof which follows.

It has been found, quite unexpectedly, that a complex catalyst comprising certain vanadium and phosphorous compounds, prepared by methods hereinafter described, is effective in converting olefins such as isobutylene to the unsaturated aliphatic aldehyde, methacrolein, at high yields. The substantial conversion of isobutylene to methacrolein achieved by this invention has economic commercial advantages.

The catalysts may be considered as mixtures of oxides of vanadium and phosphorous, probably as complexes of such oxides, or as vanadium oxyphosphates or vanadyl phosphates. The atomic ratio of vanadium to phosphorous in the catalyst should be maintained at about one gram atom of vanadium to between about one-half and four gram atoms of phosphorous, more preferably from about one gram atom of vanadium to about one to three gram atoms of phosphorous. Although the active catalyst may be formed into pellets it is more economical and practical to deposit this material on an inert carrier.

The amount of catalyst on the carrier may be varied from about five to about sixty weight percent or more, but more preferably from about ten to about twenty-five weight percent on an inert carrier such as Alundum. The amount of vanadium oxyphosphate deposited on the carrier should be enough to substantially coat the surface of the carrier and this normally is obtained within the ranges set forth above. With more absorbent carriers, larger amounts of material will be required to obtain essentially complete coverage of the carrier. Excess vanadium oxyphosphate, over that required to coat the carrier surface, is not necessary and usually will be lost by mechanical attrition.

One satisfactory procedure for preparing a typical catalyst of this invention is as follows. Vanadium pentoxide is dissolved slowly and carefully is concentrated hydrochloric acid and the mixture heated slowly. After the initial reaction the mixture is refluxed until a clear blue solution of the homogeneous complex of vanadyl chlorides (vanadium oxychloride) is obtained. Concentrated phosphoric acid is then added to the solution of vanadium oxychlorides and the mixture again refluxed. This solution is then concentrated to a point just above saturation. The vanadium in this complex has an oxidation state or valence of four to five. To this hot concentrated solution there is added Alundum which has been extracted with concentrated hydrochloric acid, washed with distilled water and dried. This mixture is treated by combined heating, tumbling and stirring to obtain a free flowing catalytic material. The drying should proceed slowly and carefully so as to not destroy the uniform coating of catalyst on the surface of the Alundum.

The novel catalysts of the invention can also be readily prepared, in addition to the procedure set forth above, by dissolving vanadium pentoxide in hydrogen iodide or hydrogen bromide. Likewise, the anhydride of phosphoric acid, $P_2O_5$, may be employed in place of phosphoric acid. In addition to vanadium oxychloride, other vanadium salts which contain an anion derived from an acid which is more volatile than phosphoric acid and which is not an oxidizing agent may be used in place of vanadium oxychloride. Thus, the oxysalts of hydriodic acid, hydrobromic acid, acetic acid, and less desirably, hydrofluoric acid and sulfuric acid and the like may be employed. Hydrochloric acid and vanadium pentoxide, or vanadium oxychloride itself or equivalent oxysalts such as the oxybromide or oxyiodide regardless of how prepared, are useful because of the economics and ease of preparation and use thereof to make the defined catalyst. Ammonium vanadate and phosphoric acid deposited on a carrier from solution makes a good catalyst. Likewise, a solution of ammonium vanadate and ammonium phosphate deposited on Alundum from a concentrated aqueous solution makes an excellent catalyst. It is believed that these compounds in aqueous solution undergo some polymerization to give salts of polyphosphovanadic or vanadophosphoric acids and may deposit on the carrier in these states. In solutions of ammonium vanadate and phosphoric acid, ammonium salts of heteropoly acids or mixtures of salts of heteropoly acids plus vanadates and phosphates probably occur. Dilute acids, both hydrochloric and phosphoric, or dilute solutions of the vanadium salts, may be employed, but this is normally not desirable since large volumes of material have to be handled and it is more costly and time consuming to remove the excess water. Normally, the solution is concentrated to a saturated solution and the Alundum or other inert carrier added thereto. This is for expediency and more dilute solutions may be employed although longer periods of time to obtain the dried catalyst material are required. The inert support may be present during the whole course of reactions to provide the desired catalyst complex.

The support or carrier for the catalyst should be inert to both the depositing solution containing the catalyst and inert under the catalytic oxidation conditions, and provides not only the required surface for the catalyst but gives physical strength and stability to the catalyst material. The carrier or support preferably has a low surface area, as usually measured, from about .01 or less to about 5 to 10 square meters per gram. A desirable form of carrier is one which has a dense non-absorbing center and a rough enough surface to aid in retaining the catalyst adhered thereto during handling and under reaction conditions. The carrier may vary in size, but preferably is from about 2 mesh to about 10 mesh. Alundum particles as large as ¼ inch are satisfactory but carriers much smaller than 10 to 12 mesh normally cause an undesirable pressure drop in the reactor. Very useful carriers are Alundum and silicon carbide or Carborundum. Any of the Alundums or other inert alumina carriers of low surface may be used. Likewise a variety of silicon carbides may be employed. Silica gel has been used. Although more economical use of the catalyst on a carrier in fixed beds is obtained, the catalyst may be employed in fluid bed systems. Of course, the particle size of the catalyst used in fluidized beds is quite small and in such systems the catalyst normally will not be provided with a carrier but will be formed into the desired particle size after drying from solution.

The reaction involving vapor phase oxidation of hydrocarbons and olefins to aliphatic aldehydes requires only passing the olefin in low concentrations in air over the described catalyst. Once the reaction is begun it is self-sustaining because of the exothermic nature thereof. Under normal conditions the life of the novel catalyst of this invention is good.

Fixed bed reactors have been found to be satisfactory for the catalytic oxidation of olefins to aldehydes with the novel catalyst of this invention. A variety of reactors will be found to be useful and multiple tube heat exchanger type reactors are quite satisfactory. The oxidation reaction is an exothermic reaction and the catalyst of this invention is somewhat heat sensitive so that relatively close control of the reaction temperature should be maintained. It is desirable to have the surface of the reactors at a relatively constant temperature and some medium to conduct heat from the reactors is necessary to aid in reducing hot spots and the like. Such media may be Woods metal, molten sulfur, mercury, molten lead and the like but it has been found that eutectic salt baths are completely satisfactory. One such salt bath is a sodium nitrate-sodium nitrite-potassium nitrate eutectic constant temperature mixture. As will be recognized by the man skilled in the art, the heat exchange medium will be kept at the proper temperature by heat exchangers and the like. The reactor or reaction tubes may be stainless steel, carbon-steel, nickel, glass tubes of the type known as Vycor, a high silica glass, and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of catalyst present.

The temperature of the reaction may be varied within some limits, but normally the reaction is conducted at temperatures within a rather narrow range. The oxidation reaction is exothermic and once the reaction is underway, the main purpose of the salt bath or other media is to conduct heat away from the walls of the reactor and control the reaction. Better operations are normally obtained when the temperature employed is no greater than about 20° above that temperature, under a given set of conditions, at which optimum conversion to acrolein and methacrolein is obtained. The temperature in the reactor, of course, will depend to some extent upon the size of the reactor and the olefin concentration, contact time and catalyst composition. Under usual operating conditions, in compliance with the preferred procedures of this invention, the temperature in the center of the reactor, measured by thermocouple, is about 550° C. with isobutylene in air at a concentration of about 1.25 mole percent and at a flow rate of about 150 grams of isobutylene per liter of catalyst per hour. The range of temperature of reactions which preferably are employed in the reactor, measured as above, should be in the range of about 475° C. to about 650° C. Described another way, in terms of salt bath reactors, with carbon steel reaction tubes, about one inch in diameter, at the defined flow rate and butene concentrations, the salt bath temperature should be controlled between about 425° C. to about 575° C. In any case, the optimum reaction temperature and/or salt bath temperature for maximum yield of desired aldehyde is readily ascertained and should be observed. Under normal conditions, the temperature in the reactor ordinarily should not be allowed to go above about 650° C. for extended lengths of time because of possible deactivation of the novel catalyst of this invention.

The aldehydes may be recovered by a number of ways well known to those skilled in the art. For example, by direct condensation or by absorption in suitable media, with subsequent separation and purification of the aldehyde.

Although the novel catalyst of this invention may be prepared in a number of ways, the catalyst used in the following examples were prepared by means of one of two methods. In the first method, vanadium pentoxide was dissolved in concentrated hydrochloric acid and the mixture refluxed for a period of time. Thereafter phosphoric acid or phosphorous pentoxide was added to the solution of vanadium oxychloride and the mixture refluxed again to obtain vanadium oxyphosphate. In another procedure, ammonium meta-vanadate was dissolved in concentrated phosphoric acid. The complex vanadium phosphate catalyst is then deposited from concentrated solution on inert carriers such as Alundum, silicon carbide, and the like which have been pretreated with concentrated hydrochloric acid, by a combined heating, tumbling, and stirring action at a temperature to obtain slow and gradual drying of the active material.

The test reactors employed were ¾ inch stainless steel tubes in a metal block. The length of the reactor tubes was approximately 3½ feet. The bottom of the reactor was filled with inert Alundum pellets and 150 milliliters of catalyst placed in the reactor and the remainder of the tube was filled with Alundum pellets. The air and hydrocarbon feed streams were metered into a mixing chamber. The catalysts were placed in the reactor at about 300° C. and were activated in a stream of air and 0.5 percent isobutylene while the temperature of the reactor was slowly raised to 500° C. over a period of 24 to 36 hours.

*Example 1*

A vanadium oxyphosphate catalyst containing one gram atom of vanadium per two gram atoms of phosphorous was prepared in hydrochloric acid from 29.3 grams of vanadium pentoxide and 75 grams of phosphoric acid as described above. The vanadium compound was then deposited on 300 grams of 4 to 6 mesh Alundum at a concentration of 20 percent. 1.7 volume percent isobutylene in air was passed through the reactor described above at a rate of 200 grams per liter catalyst hour for a contact time of 0.8 second at a block temperature of 500° C. A yield of 41.2 mole percent methacrolein was obtained.

*Example 2*

The catalyst of Example 1 was tested at a block temperature of 530° C., an isobutylene concentration in air of 1.57 volume percent, isobutylene throughput of 218 grams per liter catalyst hour and at a contact time of 0.6 second. 46.3 mole percent methacrolein was obtained.

*Example 3*

A catalyst containing 1.27 gram atoms of phosphorous per one gram atom of vanadium was prepared by digesting 103.4 grams of vanadium pentoxide and 156.8 grams of 85 percent phosphoric acid in concentrated hydrochloric acid and depositing the resulting vanadium oxyphosphate on 800 grams of 4 to 6 mesh silicon carbide to the extent of 20 percent actives on the inert carrier. A mixture of isobutylene in air containing 1.0 volume percent isobutylene, with an isobutylene throughput of 96 grams per liter catalyst hour, at a contact time of one second, and a block temperature of 460° C., was passed through the stainless steel reactor. 35.9 mole percent methacrolein was obtained under these reaction conditions.

*Example 4*

An aqueous solution containing 25.4 grams of ammonium vanadate and 40 grams of 85 percent phosphoric acid was concentrated and dried in the presence of 400 grams of acid extracted Alundum pellets to deposit 10 percent active material on said Alundum pellets. In the active catalyst material the ratio of vanadium to phosphorous was one gram atom vanadium to 1.6 gram atom phosphorous. At a block temperature of 490° C., an isobutylene concentration in air of 1.2 volume percent, isobutylene throughput of 202 grams per liter catalyst hour and a contact time of 0.6 second; a mole percent yield of 44.6 methacrolein was obtained.

The gaseous feed stream to the oxidation reactors normally will contain air and about one-half to about three mole percent hydrocarbons such as isobutylene or propene. About 1.2 to about 1.5 mole percent of the mono-olefin are satisfactory for optimum yield of product for the process of this invention. Although higher concentrations may be employed, it should be noted that explosive hazards may be encountered at higher concentrations. Concentrations of isobutylene less than about one percent, of course, will reduce the total yields obtained at equivalent flow rates and thus are not normally economically employed.

Air is entirely satisfactory for use with the olefin but it will be understood that synthetic mixtures of oxygen and inert gases, such as nitrogen, also may be employed. The flow rate of the gas stream through the reactor may be varied within rather wide limits but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about one second, and down to a rate, which is easily determined, that less efficient operations are obtained.

We claim:

1. A process for the preparation of unsaturated aliphatic aldehydes which comprises passing at a temperature in the range of about 475° C. to 650° C. a gaseous mixture of a hydrocarbon selected from the group consisting of propylene and isobutylene and oxygen through a tubular reactor containing a vanadium oxyphosphate catalyst complex wherein said catalyst complex contains vanadium and phosphorous in a gram atomic ratio of one gram atom of vanadium to one to three gram atoms of phosphorous, said gaseous mixture containing from about one-half to about three mole percent of the said hydrocarbon.

2. A process for the preparation of methacrolein which comprises passing at a temperature in the range of about 475° C. to 650° C. a gaseous mixture of isobutylene and oxygen through a tubular reactor containing a vanadium oxyphosphate catalyst complex wherein said catalyst complex contains vanadium and phosphorous in a gram atomic ratio of one gram atom of vanadium to one to three gram atoms of phosphorous and said complex is coated onto an inert carrier, said gaseous mixture containing about one-half to about three mole percent isobutylene.

3. A process for the preparation of methacrolein which comprises passing at a temperature in the range of about 475° C. to 650° C. a gaseous mixture of isobutylene and oxygen through a tubular reactor containing a catalyst complex wherein said catalyst complex contains vanadium and phosphorous in a gram atomic ratio of one gram atom of vanadium to one to two gram atoms of phosphorous, said catalyst having been prepared by reacting in solution a vanadium oxysalt and a phosphorous compound selected from the group consisting of phosphoric acid and $P_2O_5$ to form the catalyst complex and thereafter depositing said complex onto an inert carrier, said gaseous mixture containing about one-half to about three mole percent isobutylene.

4. A process for the preparation of methacrolein which comprises passing at a temperature in the range of about 475° C. to 650° C. a gaseous mixture of isobutylene and oxygen through a tubular reactor containing a catalyst complex wherein said catalyst complex contains vanadium and phosphorous in a gram atomic ratio of one gram atom of vanadium to one to two gram atoms of phosphorous, said catalyst complex having been prepared by reacting in an aqueous hydrochloric acid solution a vanadium oxychloride and a phosphorous compound selected from the group consisting of phosphoric acid and $P_2O_5$ to form a catalyst complex and thereafter depositing said complex onto an inert carrier, said gaseous mixture containing about one-half to about three mole percent isobutylene.

References Cited in the file of this patent

UNITED STATES PATENTS

| | | |
|---|---|---|
| 2,020,671 | Dreyfus | Nov. 12, 1935 |
| 2,180,353 | Foster | Nov. 21, 1939 |
| 2,524,810 | Kimberlin | Oct. 10, 1950 |
| 2,649,477 | Jacobs et al. | Aug. 18, 1953 |
| 2,659,758 | Detling et al. | Nov. 17, 1953 |
| 2,662,921 | Middleton | Dec. 15, 1953 |
| 2,734,874 | Drake et al. | Feb. 14, 1956 |
| 2,773,921 | Rylander et al. | Dec. 11, 1956 |